United States Patent [19]

Watkins, Jr. et al.

[11] Patent Number: 4,683,585
[45] Date of Patent: Jul. 28, 1987

[54] TELEPHONE HOOKING POST AND ASSEMBLY

[75] Inventors: James R. Watkins, Jr.; Ken T. Huang, both of Austin, Tex.

[73] Assignee: Motorola, Inc., Schaumburg, Ill.

[21] Appl. No.: 858,081

[22] Filed: Apr. 28, 1986

Related U.S. Application Data

[63] Continuation of Ser. No. 603,812, Apr. 25, 1984, abandoned.

[51] Int. Cl.$^4$ ............................................. H04M 1/08
[52] U.S. Cl. ..................................... 379/426; 379/437
[58] Field of Search .................. 179/100 R, 101, 102, 179/103, 158 R, 159, 167, 178; 379/419, 422, 424, 425, 426, 437

[56] References Cited

U.S. PATENT DOCUMENTS

| | | | |
|---|---|---|---|
| 1,981,649 | 11/1934 | King | 179/100 R |
| 2,357,681 | 5/1985 | Obergfell | 179/100 R |
| 2,782,261 | 2/1957 | Henrikson et al. | 179/100 R |
| 3,005,061 | 10/1961 | Cagen | 179/146 R |
| 3,073,911 | 1/1963 | Mattke et al. | 179/159 |
| 3,150,239 | 9/1964 | Fielder, Jr. | 179/146 R |
| 3,344,236 | 9/1967 | Chipping | 179/100 R |
| 3,384,718 | 5/1968 | Wilder | 179/100 D |
| 3,546,397 | 12/1970 | Lalug et al. | 179/100 R |
| 3,557,322 | 1/1971 | Walden et al. | 179/146 R |
| 3,878,343 | 4/1975 | VanDeWall | 179/100 R |
| 3,889,071 | 6/1975 | Davis et al. | 179/100 R |
| 3,941,951 | 3/1976 | Engstrom et al. | 179/179 |
| 4,117,276 | 9/1978 | Zurawski | 179/161 |
| 4,188,512 | 2/1980 | Lord | 179/159 |
| 4,349,706 | 9/1982 | Thompson | 179/100 C |
| 4,515,998 | 5/1985 | Pinede et al. | 179/146 R |

FOREIGN PATENT DOCUMENTS 1400788 7/1975 United Kingdom .

OTHER PUBLICATIONS

Motorola, Inc., "Pulsar VHF Mobile Radiotelephone", Instruction Manual No. 68P81020E05-D, Mar. 9, 1976, Section 68P81020E07-C, Operating Instructions, Sep. 19, 1975, pp. 1–10.
Motorola, Inc., "Fully Automatic Car Telephone Systems (F.A.C.T.S.) Control Head", Instruction Manual No. 68P81013E95, Oct. 27, 1971, pp. 11–13 and 37–41.
Walker, "A Service Test Mobile Telephone Control Unit", Bell System Technical Journal, vol. 58, No. 1, Jan. 1979, pp. 145–152.

Primary Examiner—Gene Z. Rubinson
Assistant Examiner—Danita R. Byrd
Attorney, Agent, or Firm—Raymond A. Jenski; Rolland R. Hackbart; Donald B. Southard

[57] ABSTRACT

An arrangement for releasably retaining a telephone apparatus in a standby condition includes a handset including an earpiece and a base having a shelf portion for receiving the earpiece. A hooking post member protrudes through the shelf portion and includes an integral spring to enable the hooking post member to be resiliently movable towards and away from the shelf portion. A switch hook which is separate from the hooking post is arranged to be actuated by the earpiece when the earpiece is brought into engagement with the base. When the earpiece engages the base shelf portion, the hooking post member is resiliently urged into contact with the earpiece for releasably retaining the earpiece on the base. A guide on the base prevents the hooking post member from twisting or rotating.

17 Claims, 4 Drawing Figures

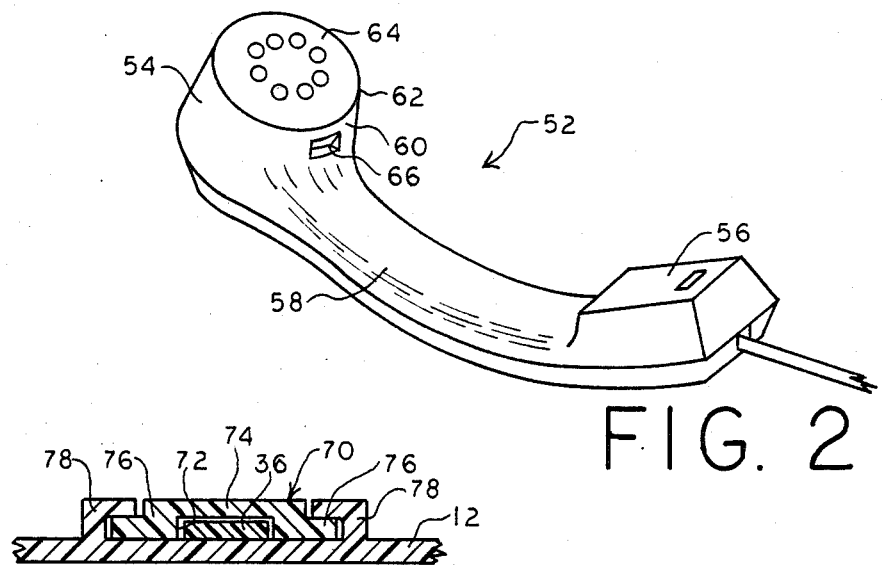
FIG. 2
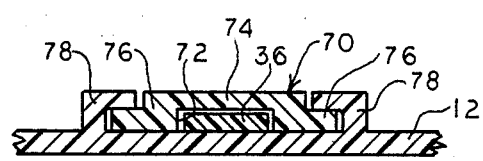
FIG. 4
FIG. 3
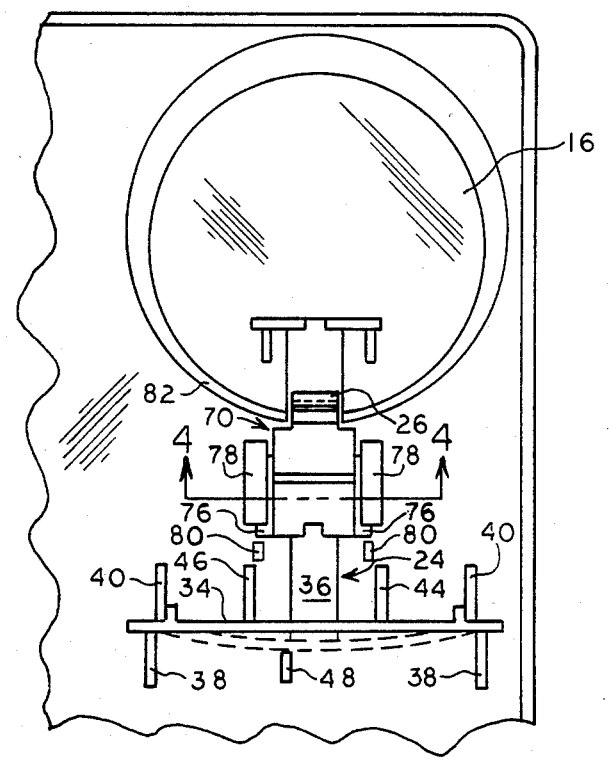

TELEPHONE HOOKING POST AND ASSEMBLY

This is a continuation of application Ser. No. 603,812, filed Apr. 25, 1984, now abandoned.

BACKGROUND OF THE INVENTION

The present invention relates to an arrangement for releasably retaining a telephone apparatus in a standby condition without specific regard to the details of the electrical equipment that comprise the telephone.

The invention is concerned with the housing structure and handset of a telephone apparatus that is, for example, adapted to be disposed in a vertical orientation as a wall instrument.

One difficulty that can arise in telephones, and more particularly in wall mounted or mobile telephones, is the dislodging effect of shock or vibration transmitted to the instrument when in a standby condition. In the past, a telephone housing structure has been utilized that includes an elongated handset having an upper portion of the front face or earpiece portion that is provided with a projecting lip surface constructed to cooperate with a complementary shelf surface portion formed on a base that is designed to be secured to a wall. The lip and shelf surface portions slope downwardly and inwardly relative to the base so as to support the handset in a vertical orientation on the base. In such telephone instruments, it is necessary to insure that a shock or vibration of the type which can be encountered will not dislodge the lip surface portion from the shelf surface portion to allow the handset to fall. On the other hand, it is desirable to minimize impedance to the intentional removal of the handset from the base by the user. In the past, to reduce the propensity of the handset from becoming dislodged, the solution has been either to make the shelf surface portion comparatively steep, which is not convenient for the user, or to make the shelf surface portion comparatively deep, which increases its inward horizontal dimension thereby increasing the distance the handset must travel before it can be dislodged. Alternatively, some combination of these two expedients can be employed. However, each has disadvantages tending to increase the overall thickness dimension of the handset or to require a shelf surface portion that is comparatively steep.

Another alternative is to provide a fixed hooking post that protrudes above the shelf portion in a substantially vertical direction to provide restraint for removal of the handset. However, use of such a hooking post requires that the earpiece pocket be relatively large to accommodate the earpiece. Further, since the hooking post is stationary, it is subject to breakage, such as, for example, if the earpiece is forcefully inserted into the pocket.

A need therefore exists for an improved arrangement for releasably retaining a telephone apparatus in a standby condition wherein the telephone apparatus is adapted to be mounted on a wall in a vertical orientation or in a vehicle where shocks and other vibration are expected to be imparted to the instrument.

SUMMARY OF THE INVENTION

The invention therefore provides an arrangement for releasably retaining a telephone apparatus in a standby condition. The arrangement includes a handset including an earpiece having a front face with a lip surface portion projecting to an edge and a base having a shelf portion for receiving the lip surface portion. A hooking post member protrudes through and beyond the shelf portion and is movable towards and away from the shelf portion. Spring means resiliently restrain movement of the hooking post member towards the shelf portion and switch hook means separate from the hooking post member and having an outer surface portion are arranged to engage the earpiece front face when the earpiece is brought into engagement with the base. As a result, when the earpiece is brought into engagement with the base upon the shelf portion, the telephone apparatus is releasably retained in a standby condition with the hooking post member resiliently urged by the spring means into contact with the earpiece lip surface for releasably retaining the earpiece in engagement with the base and with the earpiece front face engaging the switch hook means for actuating the switch hook means.

In accordance with the present invention, there is further provided a hooking post member that is adapted for use in a telephone apparatus for retaining a handset. The hooking post member includes a hooking post portion for contacting and restraining the earpiece of the handset, a flexible beam for providing resistance to movement of the hooking post away from the earpiece and a rigid beam for preventing rotation of the hooking post member when mounted in a telephone housing structure.

The hooking post member and the housing structure in accordance with the invention allows the earpiece pocket to be of substantially the same size as the earpiece of the handset. In addition, the construction of the housing in accordance with the invention provides a rugged design that is not easily susceptible to breakage or other failure.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several Figures of which like reference numerals indicate identical elements and wherein:

FIG. 2 is a perspective view of a telephone handset embodying the present invention;

FIG. 3 is a rear plan view, with portions cut away, of the housing or base structure illustrated in FIG. 1; and FIG. 4 is a cross-sectional view taken along the lines 4—4 of FIG. 3.

DETAILED DESCRIPTION

Figure 1:
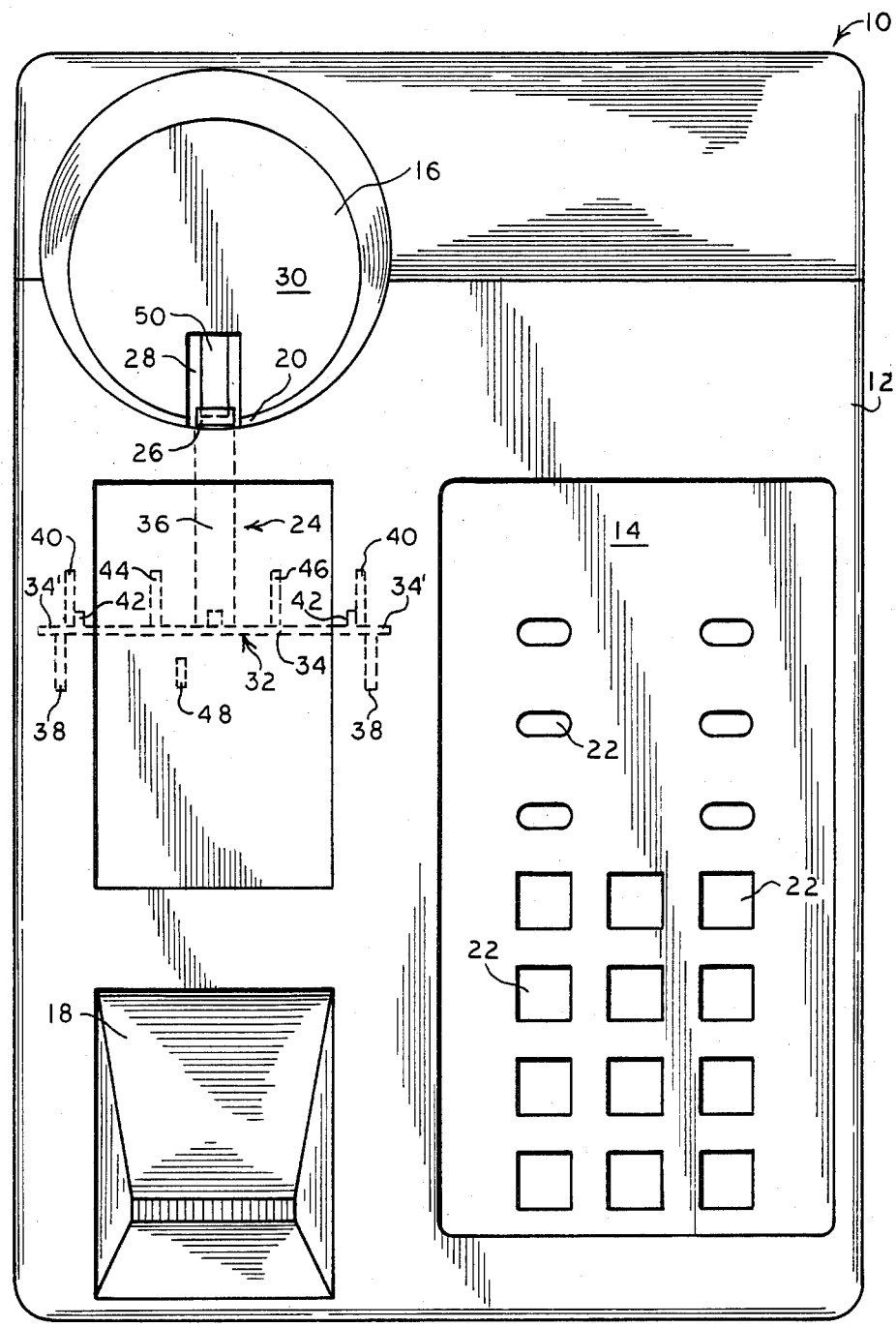
FIG. 1 is a front plan view of a housing or base structure for a telephone apparatus embodying the present invention.

Referring now to the drawings, and in particular to FIG. 1, there is illustrated in front plan view the base portion 12 of a telephone apparatus arrangement 10 embodying the present invention. The base 12, which can be formed from a plastic material, includes a keyboard portion 14, a recessed earpiece receiving pocket 16, and a recessed mouthpiece receiving pocket 18. The earpiece receiving pocket 16 and the mouthpiece receiving pocket 18 are dimensioned to be slightly larger than and configured in general correspondence to an earpiece and mouthpiece of a telephone handset of the type to be described hereinafter for receiving the handset earpiece and mouthpiece therein when the telephone apparatus 10 is to be placed into a standby condition. The keyboard portion 14 includes an array of openings 22 adapted to received press keys or the like (not shown) when the base portion 12 is brought into fixed engagement with a lower housing portion containing the electronic components of the telephone apparatus to facilitate dialing and other control of the telephone instrument.

In accordance with the present invention, the apparatus 10 further includes a hooking post member 24 which is carried by the base 12 on the back side thereof. The hooking post member 24 includes a hooking post portion 26 which projects through a slot 28 formed in a shelf 20 located at the lower portion of the recessed earpiece receiving pocket 16 and the bottom wall 30 of the earpiece receiving pocket 16. The hooking post member 24 further includes a spring means 32 which is formed by a flexible beam 34. Intermediate the hooking post portion 26 and the flexible beam 34 is a comparatively rigid beam 36. Preferably, the hooking post member 24 is formed as an integral or single piece.

The flexible beam 34 allows the hooking post portion 26 to be movable away from and towards the shelf 20 of the earpiece receiving pocket 16. To that end, the ends 34' of the flexible beam 34 are held in a fixed position by opposed ribs 38 and 40. The ribs 38 and 40 are preferably integrally formed with the base 12 and project rearwardly therefrom with the opposed ribs being spaced apart by a distance approximately equal to the thickness of the flexible beam 34. To preclude horizontal movement of the flexible beam 34, the flexible beam 34 is provided with a pair of ribs 42 which are arranged to engage the ribs 40. As a result, the ends 34' of the flexible beam 34 are held in fixed relation but the flexible beam 34 is permitted to move in a direction perpendicular thereto to allow the hooking post portion 26 to be resiliently displaced towards and away from the shelf 20 of the earpiece receiving pocket 16.

To preclude overtravel of the hooking post portion 26, the base 12 further includes stop bosses 44, 46, and 48. Bosses 44 and 46 limit the movement of the hooking post portion 26 away from the shelf 20 and boss 48 limits the movement of the hooking post portion 26 toward the shelf 20.

The base 12 further carries a switch hook 50. The switch hook 50 is preferably supported by a hinge (not shown) having a fulcrum on the back side of base 12, and more particularly, behind the wall 30 of the earpiece receiving pocket 16. As a result, the switch hook 50 is arranged for arcuate movement about its pivot and is permitted to project through the slot 28 into the recessed earpiece receiving pocket 16. The switch hook 50, as well known in the art, is coupled to the electronic components of the telephone apparatus, and when depressed, will be actuated for placing the telephone apparatus in an on-hook condition.

Referring now to FIG. 2, it illustrates in perspective view a telephone handset portion 52 of a telephone apparatus embodying the present invention. The handset 52 includes an earpiece 54, a mouthpiece 56, and an elongated handgrip portion 58 intermediate the earpiece 54 and the mouthpiece 56. As can be noted in FIGS. 1 and 2, the earpiece 54 and mouthpiece 56 of handset 52 are configured in general correspondence to the earpiece receiving pocket 16 and mouthpiece receiving pocket 18, respectively, of the base 12. As a result, when the telephone apparatus is to be placed in a standby condition, the handset 52 is brought into engagement with the base 12 with the earpiece 54 being received within the earpiece receiving pocket 16 and the mouthpiece 56 received within the mouthpiece receiving pocket 18.

The earpiece 54 includes a lip portion 60 which projects to an edge 62. The edge 62 defines a front face 64 of the earpiece 54. The lip portion 60 of the mouthpiece 54, in accordance with this preferred embodiment of the present invention, includes an indentation 66. The indentation 66 is complementary in shape with the shape of the hooking post portion 26 of the hooking post member 24.

When the telephone apparatus is to be placed in a standby condition, the handset 52 is brought into engagement with the base 12 so that the earpiece 54 and the mouthpiece 56 thereof are received within the earpiece receiving pocket 16 and the mouthpiece receiving pocket 18. As the earpiece 54 is brought into engagement with the earpiece receiving pocket 16, the hooking post portion 26 engages the edge 62 of the earpiece 54 and is deflected thereby toward the shelf 20. When the indentation 66 is in alignment with the hooking post portion 26, the hooking post portion 26 will be resiliently driven by the spring member 34 into engagement with the indentation 66 to thereby releasably retain the handset 54 on the base 12. Also, when the earpiece 54 is received within the earpiece receiving pocket 16, the front face 64 engages the switch hook 50 to depress and actuate the switch hook to cause the telephone instrument to be placed in an on-hook condition.

When the handset 52 is to be removed from the base 12, an opposite procedure ensues. More particularly, when the earpiece 54 is removed from the earpiece receiving pocket 66 the hooking post portion 26 will be deflected by the inner surface of the indentation 66 towards the shelf 20 to permit the handset 52 to be released from the base 12. At the same time, the switch hook will be released to cause the telephone instrument to be placed in an off-hook condition.

The present invention further contemplates that the earpiece receiving pocket 16 be dimensioned such that the earpiece 54 can be received therein without necessarily deflecting the hooking post portion 26 of the hooking post member 24. Because the hooking post portion 26 normally projects beyond the shelf 20, the indentation 66 of the earpiece 54 can still engage the hooking post portion 26 to be releasably retained thereon. In this case, the flexible member 34 functions to preclude damage to the telephone instrument should the handset 52 be abruptly removed from the base or should a downward force be exerted on the handset while releasably retained on the base.

Referring now to FIG. 3, it illustrates in rear plan view further details of the arrangement embodying the present invention. It illustrates the position of the hooking post member 24 when it is moved to its deflected position as indicated by the dashed lines. In order to prevent bowing of the hooking post member 24 when it is so deflected, the beam 36 is dimensioned to be comparatively rigid and a guide means 70 is provided intermediate the flexible beam 34 and the hooking post portion 26. The guide means 70 not only precludes bowing of the beam 36, but also prevents rotation of the hooking post member 24. As a result, the guide means 70 confines the beam 36 for substantially linear movement.

FIG. 4 illustrates in cross-section the guide means 70. As can be noted from FIG. 4, the guide means 70 together with the base 12 defines an elongated slot 72 to receive the beam 36 and confine the beam for substantially linear movement. More particularly, the guide means 70 includes a retaining member 74 having substantially L-shaped side portions 76 which engage complementary inverted L-shaped portions 78 of the base 12. As a result, the retaining member 74 is supported by the base 12 in a tongue and groove arrangement. As will be noted in FIG. 3, the retaining member 74 is confined against vertical movement by a pair of bosses 80 and the outer surface 82 of the earpiece receiving pocket 16.

As previously mentioned, the hooking post member is preferably a single piece which can be cast or injection molded, for example. Polyester polymers can be especially suitable in forming the hooking post member. One particularly useful material is a polyester from General Electric Co. marketed under the trademark Valox ® which is especially suitable for construction of the hooking post member. Valox ® can be characterized as having good wear resistance, a relatively low coefficient of friction (compared to ABS material) and good resiliency or spring properties.

What is claimed is:

1. An arrangement for releasably retaining a telephone apparatus in a standby condition comprising:
   a handset including an earpiece having a front face with a lip surface portion projecting to an edge;
   a base having a shelf portion for receiving said lip surface portion;
   a hooking post member having a hooking post portion protruding through and beyond said shelf portion and being movable towards and away from said shelf portion, and a
   spring means portion for resiliently restraining movement of said hooking post member towards said shelf portion, said hooking post portion being integral with said spring means portion; and
   switch hook means separate from said hooking post member and having an outer surface portion arranged to engage said earpiece front face; whereby, when said earpiece is brought into engagement with said base upon said shelf portion, said telephone apparatus is releasably retained in a standby condition with said said hooking post portion resiliently urged by said spring means portion into contact with said earpiece lip surface for releasably retaining said earpiece in engagement with said base and with said earpiece front face engaging said switch hook means for actuating said switch hook means.

2. The arrangement of claim 1 wherein said base includes a pocket for receiving said earpiece, said pocket forming said shelf portion.

3. The arrangement of claim 2 wherein the inner dimension of said pocket is slightly greater than the outer dimension of said earpiece to cause said hooking post member to be moved toward said shelf portion by said earpiece and resiliently urged into contact with said lip surface portion when said earpiece is brought into engagement with said pocket.

4. The arrangement of claim 1 wherein said spring means comprises a flexible beam structure.

5. The arrangement of claim 1 wherein said earpiece lip surface portion includes an indentation complementary with said hooking post portion for receiving said hooking post portion to facilitate the releasable retention of said handset on said hooking post member.

6. The arrangement of claim 1 wherein said base further comprises means for guiding the movement of said hooking post member.

7. The arrangement of claim 6 wherein said hooking post member further comprises a beam extending from said hooking post portion and wherein said guiding means comprises a retaining member mounted on said base and defining with said base an elongated slot dimensioned for receiving said beam and confining said beam for substantially linear movement.

8. The arrangement of claim 7 wherein said beam is intermediate said hooking post portion and said spring means.

9. The arrangement of claim 8 wherein said hooking post member is formed from polyester material.

10. A hooking post member adapted for use in a telephone apparatus including a base portion and means for retaining said hooking post member on said base portion, the hooking post member retaining a handset on said base portion and comprising:
    a movable hooking post portion for contacting and restraining the handset;
    a flexible beam portion for providing resistance to movement of said hooking post away from the handset and having each end of said beam portion retained by said base portion; and
    a substantially rigid beam portion for preventing rotation of said hooking post member.

11. The hooking post member of claim 10 wherein said member is of unitary construction.

12. The hooking post member of claim 11 wherein said member is formed from polyester material.

13. An arrangement for releasably retaining a telephone apparatus, comprising:
    a handset including an earpiece having a front face with a lip surface portion projecting to an edge;
    a base having a shelf portion for receiving said lip surface portion; and
    a hooking post member comprising:
    (a) a hooking post portion protruding through and beyond said shelf portion and being movable towards and away from said shelf portion and
    (b) a flexible portion having first and second ends coupled to said base for resisting movement of said hooking post portion away from the handset.

14. A hooking post member arrangement for releasably retaining a telephone handset in engagement with a base, comprising:
    a movable hooking post portion for contacting and restraining the handset;
    a substantially rigid beam portion, confined by a guide means of the base to prevent rotation of the hooking post member; and
    a flexible portion having first and second ends coupled to the base for resisting movement of said hooking post portion away from the handset.

15. An arrangement for releasably retaining a telephone apparatus, comprising:
    a handset having a front face with an indentation and a lip surface portion projecting to an edge; and
    a base having:
    a shelf portion for receiving said lip surface portion, and
    a hooking post member having (a) a hooking post portion protruding through said base to engage said indentation of said handset and being movable towards and away from said handset and (b) a flexible portion having first and second ends coupled to said base for resisting movement of said hooking post portion away from the handset.

16. An arrangement in accordance with claim 15 wherein said hooking post member further comprises a substantially rigid beam portion.

17. An arrangement in accordance with claim 16 wherein said base further comprises a guide means to confine said rigid beam portion to substantially linear movement thereby preventing rotation of said hooking post member.

* * * * *